United States Patent [19]

Skarvada

[11] 4,317,173
[45] Feb. 23, 1982

[54] MULTIPLE WHEEL MEMORY SELECTION DEVICE FOR BRAKE CONTROL SYSTEM

[75] Inventor: Thomas Skarvada, Woodland Hills, Calif.

[73] Assignee: Crane Co., Chicago, Ill.

[21] Appl. No.: 147,384

[22] Filed: May 7, 1980

[51] Int. Cl.³ .................... G06F 15/20; B60T 8/00
[52] U.S. Cl. .................................. 364/426; 303/96; 303/103
[58] Field of Search ............ 303/95, 96, 98, 99, 303/102, 103; 364/426

[56] References Cited

U.S. PATENT DOCUMENTS

| | | | |
|---|---|---|---|
| 3,832,009 | 8/1974 | Leiber et al. | 303/96 X |
| 3,930,688 | 1/1976 | Rau et al. | 364/426 X |
| 3,985,396 | 10/1976 | Kuwana et al. | 364/426 X |
| 4,184,203 | 1/1980 | Skarvada | 364/426 |

Primary Examiner—Jerry Smith
Attorney, Agent, or Firm—Hume, Clement, Brinks, Willian and Olds, Ltd.

[57] ABSTRACT

A memory control device for a multiple wheel brake control system includes a control bit under computer control. This control bit is coupled to one of a plurality of address terminals of a memory device such that the one address terminal can be controlled by the computer, independent of normal addressing. In this way the computer can configure the memory device to access either of two distinct blocks of memory.

35 Claims, 6 Drawing Figures

MULTIPLE WHEEL MEMORY SELECTION DEVICE FOR BRAKE CONTROL SYSTEM

BACKGROUND OF THE INVENTION

The present invention relates to a memory selection device for a brake control system.

Modern brake control systems, such as anti-skid control systems and automatic brake control systems for example, can be implemented as programmed microprocessors. Microprocessors bring significant advantages in terms of reliability, flexibility, and long term accuracy over the analog circuits used in the past.

However, because a microprocessor operates sequentially rather than in parallel, steps must be taken to maintain the signal processing time of the microprocessor within acceptable limits. Minimization of processing time is particularly critical in anti-skid control systems, where quick relaxation of braking action may be essential in preventing the development of a skid.

One approach to microprocessor based, multiple wheel, brake control systems is to use a common control program for each of the wheels in order to minimize memory requirements. Where appropriate, constants which are common to all wheels, such as thresholds, gains and the like, can be made part of the common control program. However, wheel specific variables such as measured wheel speed, as well as other dynamic variables which must be stored over time, cannot be made part of the common control program. This is because the set of variables corresponding to the particular wheel being controlled must be used. Typically, the appropriate set of wheel specific variables will change with each execution of the common control program as the microprocessor processes in sequence the various wheels being controlled.

A conventional approach to this problem is simply to indirectly address the wheel specific variables, using a calculated address that corresponds to the appropriate set of variables. This approach may, however, excessively increase the processing time, because indirect addressing by calculated address requires a significantly greater execution time than does direct addressing. In addition, indirect addressing modes require increased memory for program storage for many microprocessors.

SUMMARY OF THE INVENTION

The present invention is directed to a memory selection device for digital brake control systems that substantially reduces the indirect addressing needed to control multiple wheels with a common control program.

According to this invention, a microprocessor is connected to a memory device via an address bus which drives a first set of address terminals of the memory device. In addition, the microprocessor is coupled to an output port which includes at least one control bit coupled to at least one additional address terminal of the memory device. By setting the at least one control bit to the appropriate logical state, the microprocessor can select any one of a plurality of memory blocks, memory words of which are directly addressable in the conventional manner via the address bus.

An important advantage of this invention is that the microprocessor can select one of several memory blocks via the at least one control bit, and then directly address individual words of that block in the conventional manner. For example, in a two wheel anti-skid system in which a common control program is used for both wheels, the microprocessor can set the control bit to configure the memory for either Wheel 1 or Wheel 2, and then execute the common control program using direct addressing. Corresponding variables for Wheel 1 and Wheel 2 preferably have the same address except for the address terminal set by the control bit. Thus, the control program alternately controls Wheel 1 and Wheel 2, depending on the state of the control bit, without extensive indirect addressing. In this way processing time is significantly reduced over previous approaches which relied extensively on indirect addressing. In addition, memory size required to store the control program is reduced for many microprocessors.

The invention, together with further objects and attendant advantages, will best be understood by reference to the following detailed description taken in connection with the accompanying drawings.

DETAILED DESCRIPTION OF PREFERRED EMBODIMENTS

Figure 1:
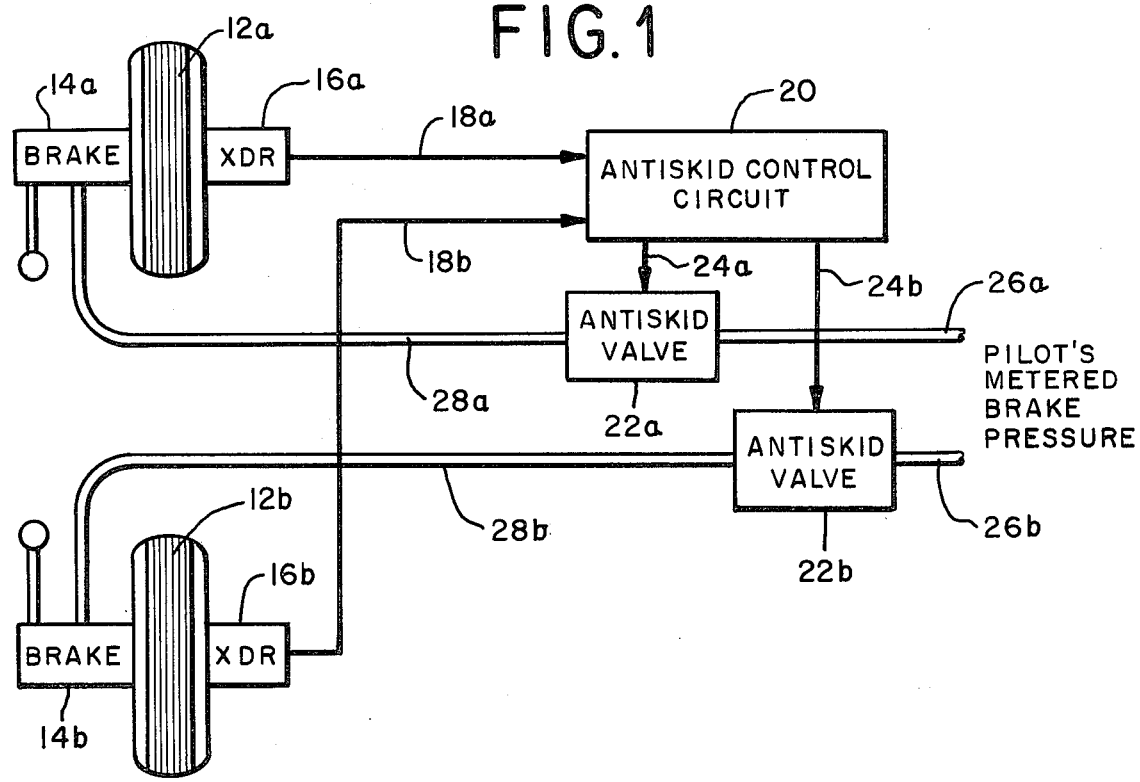
FIG. 1 is a block diagram of a two wheel anti-skid brake control system which includes a first preferred embodiment of the present invention.

Referring now to the drawings, FIG. 1 is a general block diagram of an anti-skid brake control system including a first preferred embodiment of the present invention. This brake control system includes a first rotatable wheel 12a and a second rotatable wheel 12b. Each wheel 12a,12b is provided with a brake 14a,14b, and a wheel speed transducer 16a,16b, respectively. Each of the wheel speed transducers 16a,16b operates to generate a wheel signal on the respective conductor 18a,18b. Each wheel signal is a sinusoidally varying signal having a frequency which varies as a direct function of the speed of the associated wheel 12a,12b. These wheel signals are applied as inputs to an anti-skid control circuit 20 which acts to monitor each wheel signal to detect excessive braking conditions. When an excessive braking condition is detected, which would induce a wheel skid if not corrected, the antiskid control circuit 20 produces a brake control signal on the respective conductor 24a,24b, which is applied as an input to an antiskid valve 22a,22b.

Each anti-skid valve 22a,22b operates to reduce pressure applied to the respective brake 14a,14b. In the embodiment of FIG. 1, the pilot's metered brake pressure is applied via hydraulic lines 26a,26b to the anti-skid valves 22a,22b. During periods when the anti-skid control circuit 20 is not commanding a reduction in brake pressure, the anti-skid valves 22a,22b pass the metered brake pressure via the hydraulic lines 28a,28b directly to the brakes 14a,14b. However, when an excessive braking condition is detected, the anti-skid control circuit 20 generates brake control signals or conductors 24a,24b which cause the antiskid valves 22a,22b to reduce the brake pressure applied to the brakes 14a,14b to a value below the metered brake pressure. In this way, braking action applied to the wheels 12a,12b is reduced as necessary to optimize braking efficiency.

Figure 2:
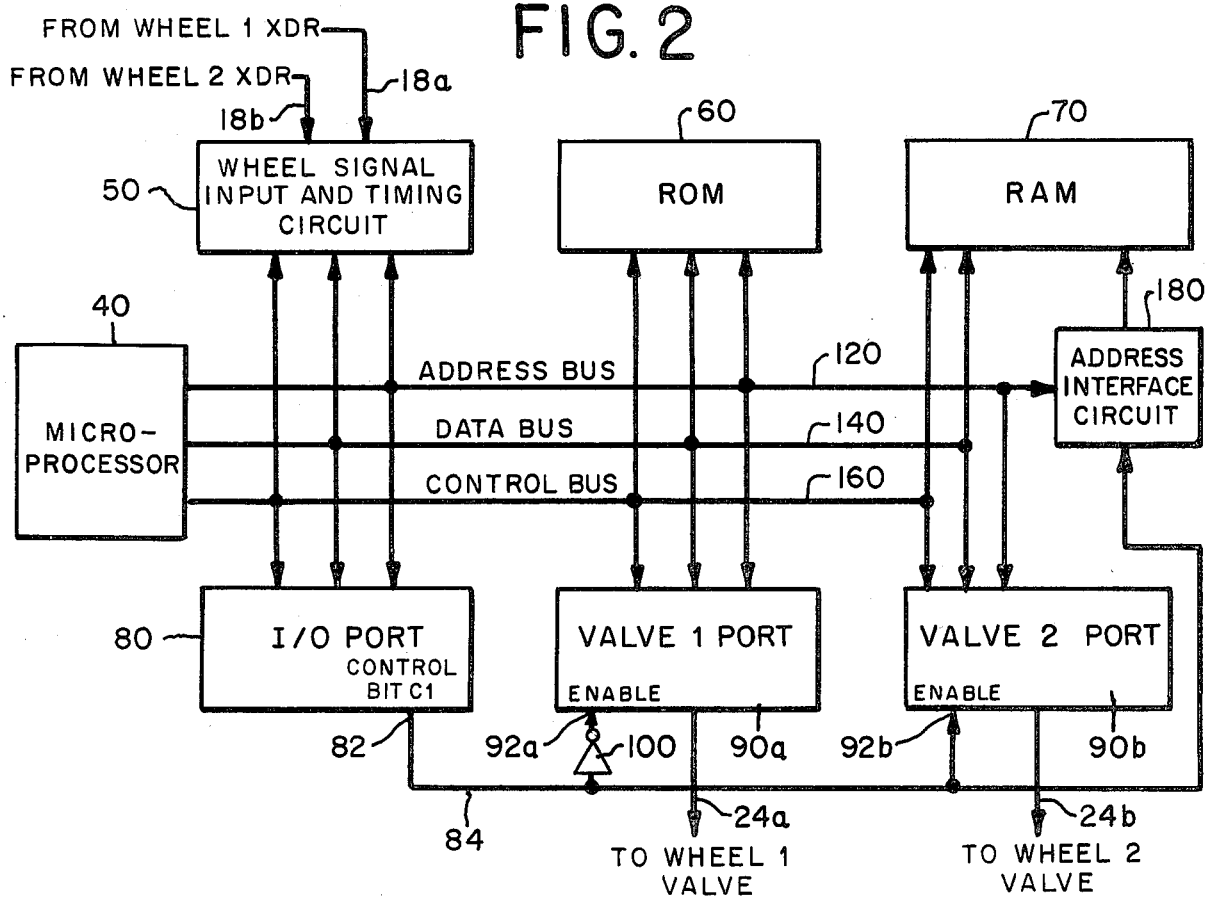
FIG. 2 is a block diagram of the control circuit of FIG. 1.

FIG. 2 presents a detailed block diagram of the anti-skid control circuit 20 of FIG. 1. As shown in FIG. 2, the anti-skid control circuit 20 includes a microprocessor 40 which is coupled to an address bus 120, a data bus 140, and a control bus 160. These three buses 120,140,160 provide essential interconnections among the microprocessor 40, the wheel signal input and timing circuit 50, the read only memory (ROM) 60, the random access memory (RAM) 70, the input-output port 80, the first valve portion 90a, and the second valve port 90b.

In this preferred embodiment, wheel signals from the first and second wheels 12a,12b are applied via conductors 18a,18b to the wheel signal input and timing circuit 50. This circuit 50 serves to convert the continuously varying wheel signal on lines 18a,18b to a digital signal suitable for input to the microprocessor 40. In addition, the circuit 50 provides a digital measure of the period of the wheel signals on lines 18a and 18b.

The ROM 60 serves to store the microprocessor program as well as fixed parameters used in determining the brake control signals. These parameters include such variables as scaling values, maximum values, minimum values, gain values, and the like, used in the execution of the program stored in the ROM 60.

The RAM 70 serves to store dynamically varying parameters which change during the execution of the program stored in the ROM 60. For example, the RAM 70 provides storage locations for such parameters as wheel speed and varying intermediate values generated during the execution of the program stored in the ROM 60.

The input-output port 80 is a conventional port having a control bit C1 which includes a control bit terminal 82. This control bit C1 can be set or reset by the microprocessor 40, and is used as explained below to control addressing of the RAM 70 and the enabling of the valve ports 90a,90b.

The valve ports 90a,90b each include a storage register in which the instantaneous state of the data bus 140 can be stored. In addition, each port 90a,90b includes a digital to analog converter to convert the binary number stored in the respective storage register to an analog signal, which is then amplified and output via conductors 24a,24b to control the respective anti-skid valves 22a,22b. Each valve port 90a,90b includes a port enable terminal 92a,92b. A digital signal must be applied to the enable terminal 92a,92b in order to activate the port 90a,90b to allow a new binary number to be stored in the respective storage register of the port 90a,90b.

The foregoing description has been provided to clarify the environment of this first preferred embodiment of this invention. In particular, the microprocessor 40, the ROM 60, the RAM 70, and the input-output port 80 are conventional, commercially available components. In this preferred embodiment, the microprocessor 40 is a Z-80 CPU circuit marketed by Zilog, Inc. of Cupertino, Calif. The ROM 60 is a conventional digital memory device which includes means for storing 2048 eight-bit digital words. The RAM 70 is a conventional, commercially available device which includes means for storing 1024 eight-bit digital words. Of course, either or both of the ROM 60 and the RAM 70 can be made up of two or more separate devices, each of which stores only a portion of the data. The input-output port 80 is a conventional output port, having at least one output bit C1. The wheel signal input and timing circuit 50 and the valve ports 90a,90b can take any of a number of forms, and the precise structures of these components do not form a part of the present invention.

Figure 3:
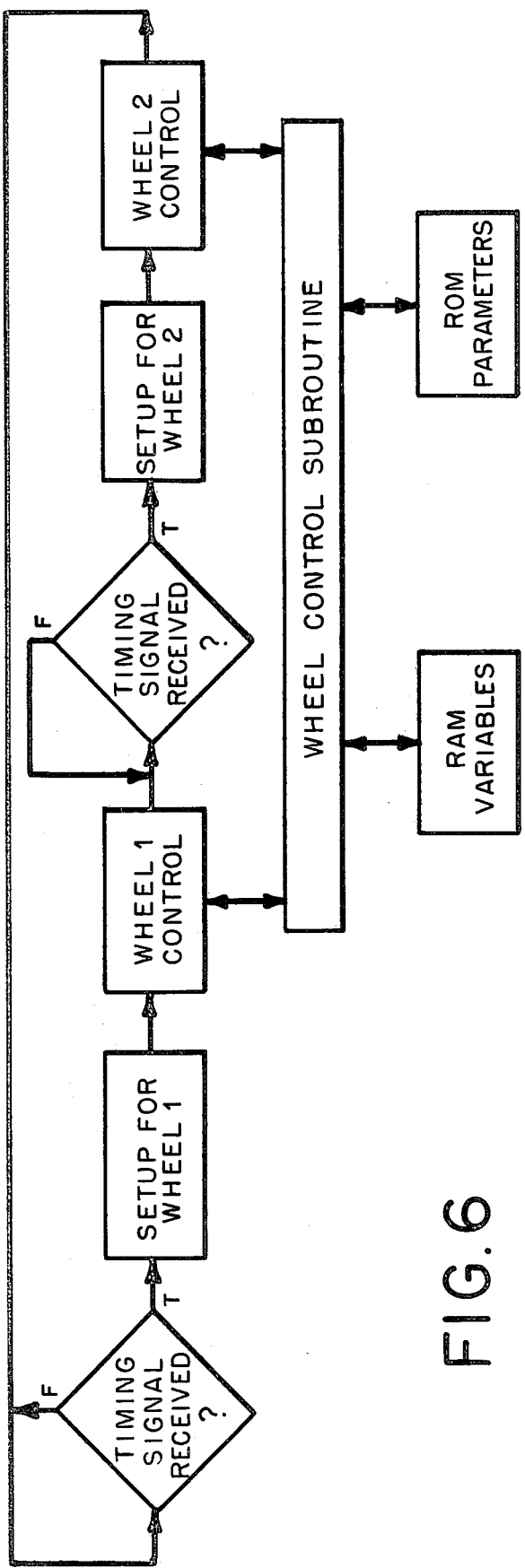
FIG. 3 is a flow diagram of the operation of the control circuit of FIG. 2.

Turning now to FIG. 3, the program executed by the microprocessor 40 is flowcharted in general terms. This general flowchart does not include such features of the program as initialization, self-test, or other routine functions. It is presented here merely to provide a general indication of the manner in which the single microprocessor 40 serves to generate brake control signals for each of the valves 22a,22b.

Starting from the extreme lefthand side of FIG. 3, the program first waits for a timing signal to be received from the input and timing circuit 50. Once this signal is received, the microprocessor executes a set-up routine for the first wheel 12a, at which time the memory is configured to generate a control signal for the first wheel, as will be explained below. Then the microprocessor generates a brake control signal for the first wheel by calling a common wheel control subroutine. This wheel control subroutine accesses the ROM 60 to obtain parameters which remain the same for both the first and second wheels, as well as the RAM 70 to obtain wheel specific variables. This wheel control subroutine utilizes input information provided by the wheel speed input and timing circuit 50 and the stored wheel specific variables in the RAM 70 to generate a brake control signal which is then loaded into the storage register of the first valve port 90a to control the respective anti-skid valve 22a. Once this is completed, the wheel control subroutine then returns control to the main program.

The microprocessor then waits for another timing signal from the wheel signal input and timing circuit 50. Once this timing signal is received, the microprocessor then figures the memory for the second wheel and then calls the common wheel control subroutine again. Because the memory has been configured for the second wheel, the wheel specific variables stored in the RAM 70 are now those appropriate for the second wheel rather than the first wheel, and the common wheel control subroutine now operates to generate a brake control signal which is then stored in the storage register of the second valve port 90b in order to generate an appropriate brake control signal on line 24b. Control is then returned to the main program, which then loops and again waits for a timing signal before configuring the memory for the first wheel.

In considering the flowchart for FIG. 3, it is important to recognize that the same wheel control subroutine generates brake control signals for both the first and second wheels. Because of the memory selection device to be described in detail below, the same wheel control subroutine can be used to generate both brake control signals, without extensive indirect addressing. Instead, the RAM 70 is configured prior to each execution of the wheel control subroutine such that the same program instructions in the wheel control subroutine are appropriate for either the first or second wheel, depending upon the configuration of the RAM 70.

Figure 4:
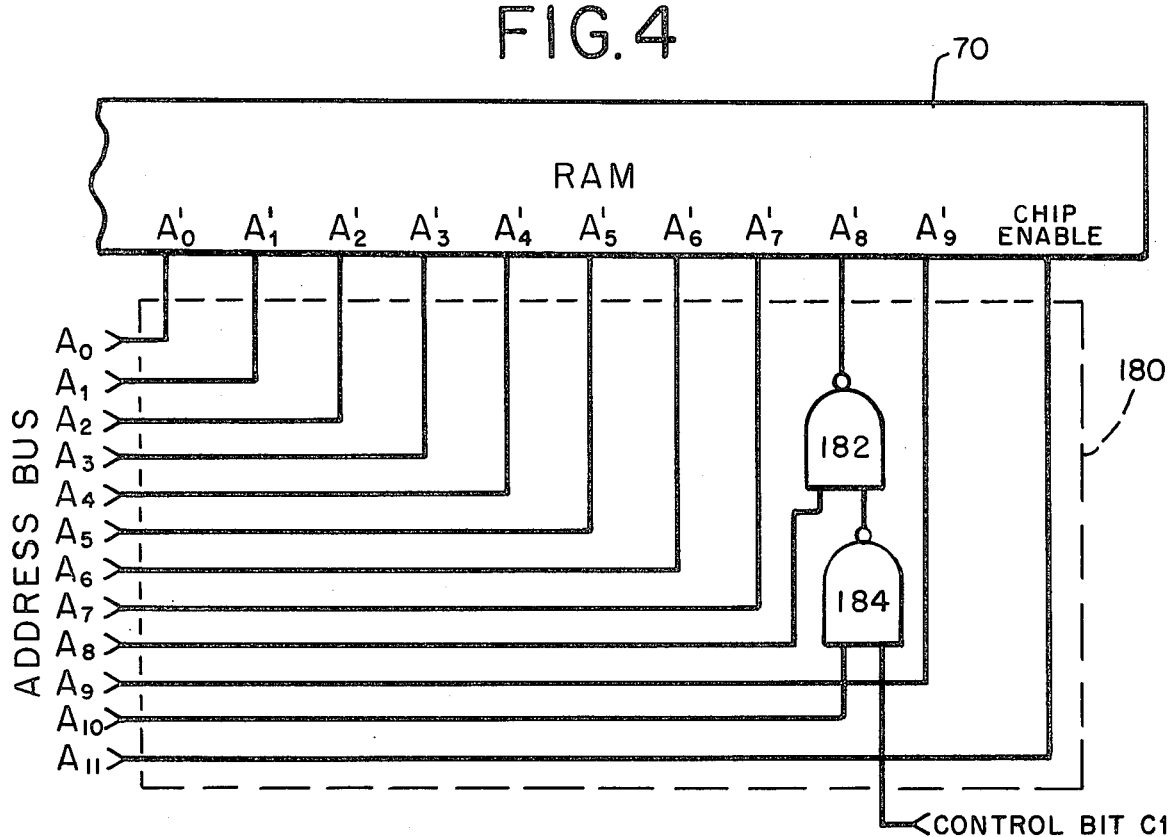
FIG. 4 is a detailed circuit diagram of a portion of the control circuit of FIG. 2.

As shown generally in FIG. 2, RAM 70 is configured as appropriate for either the first or second wheel by means of the address interface circuit 180, which is shown in detail in FIG. 4. In FIG. 4, the address bus conductors are labeled $A_0$ through $A_{11}$. Address terminals of the RAM 70 are labeled $A_0'$ through $A_9'$. In addition, the RAM 70 includes a chip enable terminal, as shown in FIG. 4. The address interface circuit 180 includes conductors for connecting address bus lines $A_0$ through $A_7$ directly to respective RAM address terminals $A_0'$ through $A_7'$. Thus, RAM address terminals $A_0'$ through $A_7'$ operate in the conventional manner, driven by conductors $A_0$ through $A_7$ of the address bus. Address bus conductor $A_8$ is connected to an input terminal of a NAND gate 182, the output of which is connected to RAM address terminal $A_8'$. The NAND gate 182 includes a second input terminal which is connected to the output terminal of a second NAND gate 184. This second NAND gate 184 includes two input terminals, one of which is connected to address bus conductor $A_{10}$, and the other of which is connected to control bit C1. Address bus conductor $A_{11}$ is connected to the chip enable terminal of the RAM 70.

Table I shows the manner in which the address interface circuit 180 can be used to configure the RAM 70. The NAND gates 182,184 serve to provide two separate addressing modes, depending on the address signals placed on address bus conductor $A_{10}$. When conductor $A_{10}$ is in the Logic 0 state, corresponding to address signals in the range 800 to BFF, conventional addressing of the RAM 70 is provided. That is, the RAM 70 appears to the microprocessor 40 as a single block of 1024 digital words, regardless of the state of the control bit C1. Because the NAND gate 182 serves to invert the signal on address bus conductor $A_8$, consecutive address signals on the address bus conductors $A_0$ through $A_{11}$ do not always address consecutive memory locations in the RAM 70. However, this is not apparent to the microprocessor 40, and in fact the RAM 70 appears to be a single consecutive block of digital words in the conventional addressing mode.

The modified address mode is attained by placing a Logic 1 signal on address bus conductor $A_{10}$. Thus, addresses in which the third place address digit is C, D, E, or F (hexadecimal) automatically call up the modified addressing mode. In the modified addressing mode, the state of the control bit C1 is central to determining the configuration of the RAM 70. Of the four possible third place digits which call up the modified addressing mode, only the digit D is used in this preferred embodiment.

As shown in Table I, for addresses D00 through DFF on the address bus, the microprocessor 40 can access one of two distinct blocks of RAM 70. When the control bit C1 is in the Logic 0 state, these addresses access memory words 100 through 1FF. On the other hand, when the control bit C1 is in the Logic 1 state, these same addresses D00 through DFF on the address bus access memory words 000 through 0FF of the RAM 70.

The addresses C00 through CFF, E00 through EFF, and F00 through FFF are not used in the modified addressing mode, for they are redundant. For example, C00 through CFF accesses memory words 000 through 0FF whether the control bit C1 is in the Logic 0 or the Logic 1 state. However, memory words 000 through 0FF can also be accessed by addresses 900 through 9FF. Thus, addresses C00 through CFF are redundant. Similarly, addresses E00 through EFF merely address the same memory words as addresses B00 through BFF, and addresses F00 through FFF address either the memory words addressed by A00 through AFF or B00 through BFF depending on the state of the control bit C1.

Having explained the structure of the first preferred embodiment, it is now possible to describe its operation. When at any point in the program it is desired to directly access a specific one of the memory words stored in the RAM 70, conventional addressing is accomplished with addresses 800 through BFF. However, the wheel control subroutine, which operates alternately to generate brake control signals for both the first and second wheels, utilizes the modified addressing mode, and in particular addresses D00 through DFF, to access memory words stored in the RAM 70 containing wheel specific variables.

The setup routine for the first wheel operates to clear the control bit C1 such that a Logic 0 signal is generated by C1. Then, when the wheel control subroutine is next executed, the addresses D00 through DFF will automatically access memory words 100 through 1FF. These memory words, which are designated memory block one, contain the wheel specific variables, such as wheel speed and intermediate dynamic variables, for the first wheel.

After the brake control signal is generated and control is returned to the main program, the RAM 70 is then configured for the second wheel by setting the control bit C1 to the Logic 1 state. When the common wheel control subroutine is next executed, the same addresses D00 through DFF now access memory words 000 through 0FF. These memory words are designated as memory block two, and they contain corresponding variables for the second wheel as those found in memory block one.

In this preferred embodiment, the same variables for the first wheel are stored in block one in the same relative order as the variables for the second wheel, which are stored in block two. Thus, the identical set of program instructions in the wheel control subroutine can generate brake control signals for either the first or the second wheel, depending on the state of the control bit C1. This advantageous result is obtained without extensive indirect addressing, which, if required, would substantially slow the operation of the microprocessor 40.

In addition, the same control bit C1, which operates to configure the RAM 70, also operates to selectively enable the appropriate one of the two valve ports 90a,90b. The control bit C1 is coupled directly via conductor 84 to the enable terminal 92b of the second valve port 90b. In addition, the conductor 84 is coupled via an inverter 100 to the enable terminal 92a of the first valve port 90a. Thus, when the control bit C1 is set to the Logic 0 state to configure the RAM 70 for the first wheel, the first valve port 90a is automatically enabled and the second valve port 90b is automatically disabled. Conversely, when the control bit C1 is set to the Logic 1 state to configure the RAM 70 for the second wheel, the first valve port 90a is automatically disabled and the second valve port 90b is automatically enabled. This facilitates the usage of the same set of program instructions in the wheel control subroutine to actually load the brake control signal into the storage register of the appropriate valve port 90a,90b.

Various changes and modifications to the preferred embodiment of FIGS. 1-3 will be apparent to those skilled in the art. For example, the NAND gates 182,184 of FIG. 4 can be eliminated if desired. In this case, the RAM address terminal $A_8'$ would be driven directly by the control bit C1. With this modification, the RAM 70 could no longer be addressed in the conventional addressing mode. Instead, the RAM 70 is directly configured by the control bit C1 to access the memory block appropriate to either the first or the second wheel, depending on the state of the control bit C1.

Figure 5:
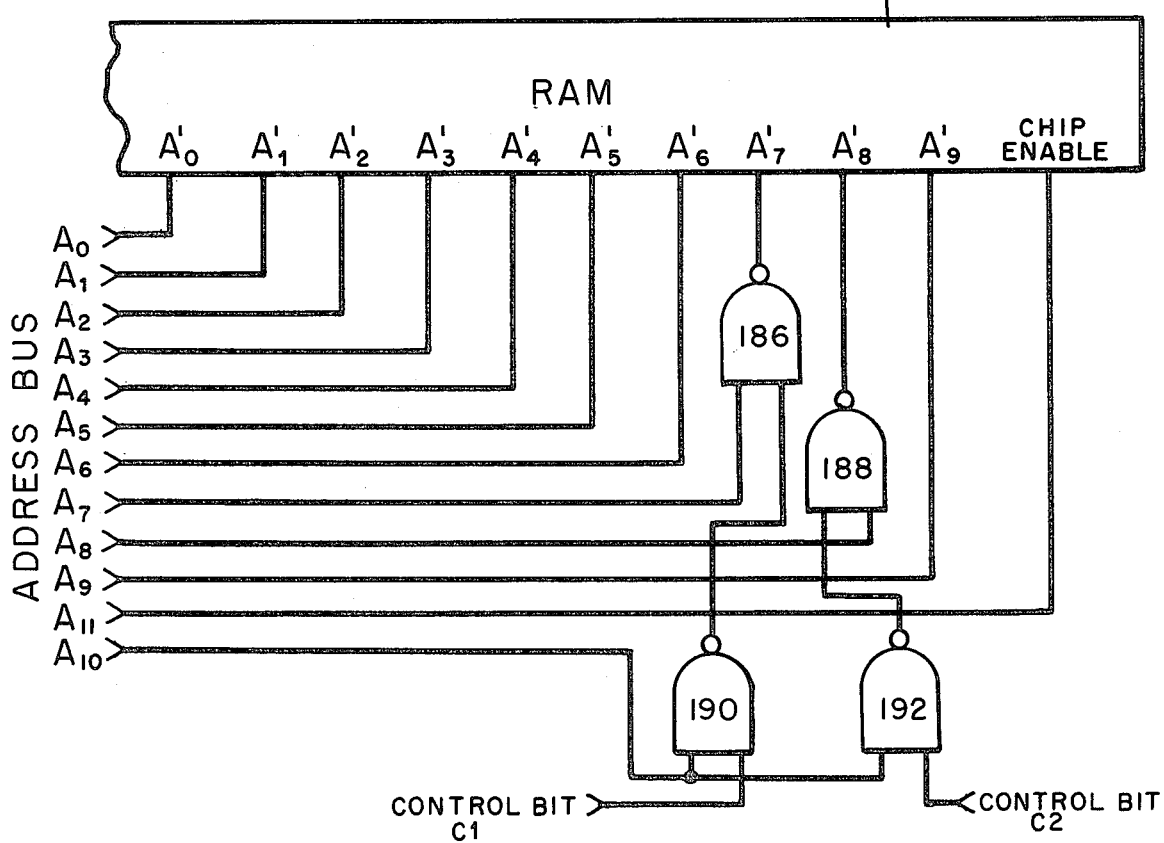
FIG. 5 is a detailed circuit diagram of a portion of a second preferred embodiment, corresponding generally to the circuit diagram of FIG. 4.

In addition, the present invention is not limited to memory selection devices for only two wheels. FIG. 5 shows a second preferred embodiment which employs two control bits C1,C2 which can be individually and independently set and reset by the microprocessor 40. As shown in FIG. 5, these control bits C1,C2 drive inputs of two NAND gates 190,192. Each NAND gate 190,192 includes a second input which is coupled to the $A_{10}$ conductor of the address bus. The output of the NAND gate 190 is applied as an input to a NAND gate 186, which receives a second input from conductor $A_7$ of the address bus. The output of this NAND gate 186 drives address terminal $A_7'$ of the RAM 70. Similarly, the output of the NAND gate 192 is applied as an input to NAND gate 188, which also receives an input signal from conductor $A_8$ of the address bus. The output of this NAND gate 188 drives address terminal $A_8'$ of the RAM 70.

Table II tabulates the effect of control bits C1,C2 of FIG. 4 on the configuration of the RAM 70. As before, addresses 800 through BFF work in a conventional addressing mode to sequentially address the 1024 words of the RAM 70. In the modified addressing mode, addresses D80 through DFF serve to access any one of four distinct memory blocks in the RAM 70. These four memory blocks are defined in detail in Table II, and can be used, for example, to store wheel specific variables for four separate wheels in an anti-skid control system. In this preferred embodiment, each of the four memory blocks of the RAM 70 contains 128 memory words.

Figure 6:
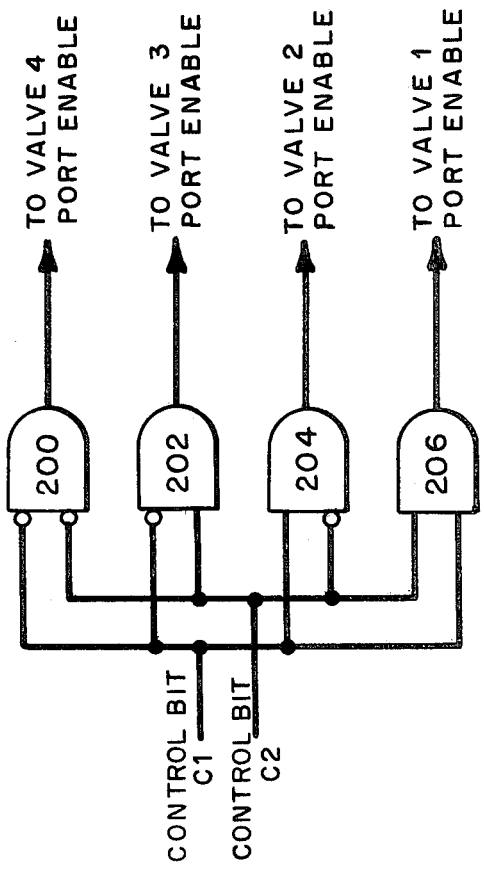
FIG. 6 is a detailed circuit diagram of an additional portion of the second preferred embodiment of FIG. 5.

FIG. 6 shows a simple circuit which can be used in conjunction with the two control bits C1,C2 of the second preferred embodiment to enable the appropriate one of four separate valve ports. In the circuit of FIG. 6, a NAND gate 200 enables a fourth valve port when both C1 and C2 are in the Logic 0 state. A NAND gate 202 enables a third valve port when C1 is in the Logic 0 state and C2 is in the Logic 1 state. A NAND gate 204 enables a second valve port when C1 is in the Logic 1 state and C2 is in the Logic 0 state. A NAND gate 206 enables a first valve port when C1 and C2 are both in the Logic 1 state.

From the foregoing it should be apparent that the present invention operates both to simplify the use of a common wheel control subroutine to generate brake control signals for two or more separate wheels, and substantially to reduce the need for indirect addressing in such wheel control subroutines. By eliminating the need for extensive indirect addressing, the execution speed of the wheel control subroutine is increased, and the program memory requirements for microprocessors are reduced. Thus, the present invention facilitates the use of a single microprocessor to control more than one brake in a multiple wheel brake control system. This in turn can provide significant improvements in terms of reducing the cost, size and weight of the anti-skid control system.

Of course, it should be understood that various changes and modifications to the preferred embodiments described above will be apparent to those skilled in the art. For example, the present invention can be used with other types of memories in addition to random access memories, with memories of varying sizes, and in other brake control systems. In addition, the precise programming of the microprocessor 40 can be varied, as can other components of the anti-skid control system. These and other changes and modifications can be made without departing from the true spirit and scope of the present invention. It is therefore intended that all such changes and modifications be covered by the following claims.

TABLE I

| ADDRESS BUS ($A_{11}$-$A_0$) | CONTROL BIT ($C_1$) | RAM ($A_9'$-$A_0'$) | MEMORY BLOCK |
|---|---|---|---|
| 800-8FF | 0 or 1 | 100-1FF | 1 (WHEEL 1) |
| 900-9FF | 0 or 1 | 000-0FF | 2 (WHEEL 2) |
| A00-AFF | 0 or 1 | 300-3FF | 3 (COMMON) |
| B00-BFF | 0 or 1 | 200-2FF | 4 (COMMON) |
| C00-CFF | 0 | 000-0FF | 2 (NOT USED) |
|  | 1 | 000-0FF | 2 |
| D00-DFF | 0 | 100-1FF | 1 |
|  | 1 | 000-0FF | 2 |
| E00-EFF | 0 | 200-2FF | 4 (NOT USED) |
|  | 1 | 200-2FF | 4 |
| F00-FFF | 0 | 300-3FF | 3 (NOT USED) |
|  | 1 | 200-2FF | 4 |

TABLE II

| ADDRESS BUS ($A_{11}$-$A_0$) | CONTROL BITS C1 | CONTROL BITS C2 | RAM ($A_9'$-$A_0'$) | MEMORY BLOCK |
|---|---|---|---|---|
| 800-87F | 0 or 1 | 0 or 1 | 180-1FF | 1 (WHEEL 1) |
| 880-8FF | 0 or 1 | 0 or 1 | 100-17F | 2 (WHEEL 2) |
| 900-97F | 0 or 1 | 0 or 1 | 080-0FF | 3 (WHEEL 3) |
| 980-9FF | 0 or 1 | 0 or 1 | 000-07F | 4 (WHEEL 4) |
| A00-A7F | 0 or 1 | 0 or 1 | 380-3FF | 5 (COMMON) |
| A80-AFF | 0 or 1 | 0 or 1 | 300-37F | 6 (COMMON) |
| B00-B7F | 0 or 1 | 0 or 1 | 280-2FF | 7 (COMMON) |
| B80-BFF | 0 or 1 | 0 or 1 | 200-27F | 8 (COMMON) |
| D80-DFF | 0 | 0 | 000-07F | 4 |
|  | 0 | 1 | 080-0FF | 3 |
|  | 1 | 0 | 100-17F | 2 |
|  | 1 | 1 | 180-1FF | 1 |

I claim:

1. In a digital brake control system for a vehicle including first and second braked wheels, computer means for generating first and second brake control signals, and control means, responsive to the first and second control signals, for modifying the braking action applied to the first and second wheels, the improvement comprising:
   a digital memory device having a plurality of address terminals including a first address terminal and a plurality of additional address terminals, said memory device including means for storing first and second blocks of parameters associated with the first and second wheels, respectively;
   an address bus having a plurality of conductors, each of which extends between the computer means and a respective one of the plurality of additional address terminals;
   an output port coupled to the computer means, said port including a control bit which can be placed in one of two logic control states by the computer means; and
   means for connecting the control bit to the first address terminal such that the control bit can be used to control the logic state of the first address terminal, without affecting the state of the address bus, such that the computer means can select one of the first and second blocks of parameters for direct addressing via the address bus by placing the control bit in a respective one of the two logic control states.

2. The invention of claim 1 wherein the brake control system is an anti-skid brake control system.

3. The invention of claim 1 wherein the connecting means includes a simple connection between the control bit and the first address terminal.

4. The invention of claim 1 wherein the invention further comprises:
means, responsive to the computer means, for selectively controlling the first address terminal independently of the control bit such that computer means can directly address both the first and second blocks of parameters, regardless of the control state of the control bit.

5. The invention of claim 4 wherein the controlling means is responsive to at least one additional conductor included in the address bus.

6. The invention of claim 4 wherein the controlling means comprises a digital logic circuit having a first input terminal coupled to a first additional conductor included in the address bus, a second input terminal coupled to a second additional conductor included in the address bus, a third input terminal coupled to the control bit, and an output terminal coupled to the first address terminal.

7. The invention of claim 6 wherein the digital logic circuit comprises:
a first gate responsive to the control bit and the first additional conductor, said first gate generating a logic signal; and
a second gate responsive to the logic signal and the second additional conductor, said second gate generating an output signal on the output terminal.

8. The invention of claim 7 wherein the first gate and the second gate are NAND gates.

9. The invention of claim 1 wherein the memory device is a random access memory.

10. The invention of claim 1 wherein the computer means includes first and second valve ports for generating the first and second brake control signals, respectively, each of the valve ports having a port enable terminal, wherein the invention further comprises:
decoding means, responsive to the control bit, for applying a port enable signal to the port enable terminal of a selected one of the first and second valve ports in accordance with the logic state of the control bit, such that the computer means can selectively enable any one of the first and second valve ports by appropriately setting the logic state of the control bit.

11. In a digital brake control system for a vehicle including first and second braked wheels, computer means for generating first and second brake control signals, and control means, responsive to the first and second control signals, for modifying the braking action applied to the first and second wheels, the improvement comprising:
a digital memory device having a plurality of address terminals including a first set of address terminals and a second set of address terminals;
address bus means for connecting the first set of address terminals to the computer means;
an output port coupled to the computer means, said port including at least one control bit having a logic state which can be controlled by the computer means;
means for connecting the at least one control bit to the second set of address terminals such that the logic state of the second set of address terminals is responsive to the logic state of the at least one control bit;
means, included in the memory device, for storing a first set of parameters associated with the first wheel, each of the parameters in said first set of parameters having a unique digital address corresponding to a unique logical state of the first and second address terminals; and
means, included in the memory device, for storing a second set of parameters associated with the second wheel, each of the parameters in said second set of parameters corresponding to a respective one of the parameters in said first set of parameters, such that the digital addresses of corresponding parameters in the first and second sets of parameters differ only in the logic state of the second set of address terminals, each parameter of the first set of parameters having an address characterized by a first logic state of the second set of address terminals, and each parameter of the second set of parameters having an address characterized by a second logic state of the second set of address terminals, different from the first logic state.

12. The invention of claim 11 wherein the second set of address terminals includes only one address terminal.

13. The invention of claim 11 wherein the second set of address terminals includes two address terminals.

14. The invention of claim 11 wherein the means for connecting the at least one control bit to the second set of address terminals comprises a simple connection between a first address terminal included in the second set of address terminals and the at least one control bit such that the logic state of the first address terminal tracks the logic state of the at least one control bit.

15. The invention of claim 11 wherein the connecting means further comprises:
means, responsive to the computer means, for selectively controlling the logic state of the second set of address terminals independently of the logic state of the at least one control bit such that the computer means can directly address both the first and second sets of parameters, regardless of the logic state of the at least one control bit.

16. The invention of claim 15 wherein the controlling means is responsive to at least one additional conductor included in the address bus.

17. The invention of claim 15 wherein the at least one control bit includes a first control bit and the controlling means comprises a digital logic circuit having a first input terminal coupled to a first additional conductor included in the address bus means, a second input terminal connected to a second additional conductor included in the address bus means, a third input terminal connected to the first control bit, and a first output terminal coupled to a first address terminal included in the second set of address terminals.

18. The invention of claim 17 wherein the digital logic circuit comprises:
a first gate responsive to the first control bit and the first additional conductor, said first gate generating a logic signal; and
a second gate responsive to the logic signal and the second additional conductor, said second gate generating an output signal on the first output terminal.

19. The invention of claim 18 wherein the first gate and the second gate are NAND gates.

20. The invention of claim 17 wherein the at least one control bit additionally includes a second control bit and the digital logic circuit further includes a fourth input terminal connected to the second control bit, a fifth input terminal connected to a third additional conductor included in the address bus means, and a second output terminal coupled to a second address terminal included in the second set of address terminals.

21. The invention of claim 20 wherein the logic circuit comprises:
 a first gate responsive to the first control bit and the first additional conductor, said first gate generating a first logic signal;
 a second gate responsive to the first logic signal and the second additional conductor, said second gate generating a first output signal on the first output terminal;
 a third gate responsive to the second control bit and the first additional conductor, said third gate generating a second logic signal; and
 a fourth gate responsive to the second logic signal and the third additional conductor, said fourth gate generating a second output signal on the second output terminal.

22. The invention of claim 21 wherein each of the first, second, third and fourth gates is a NAND gate.

23. The invention of claim 11 wherein the memory device is a random access memory.

24. The invention of claim 11 wherein the computer means includes first and second valve ports for generating the first and second brake control signals, respectively, each of the valve ports having a port enable terminal, wherein the invention further comprises:
 means for connecting the port enable terminal of the first valve port to the at least one control bit; and
 an inverter having an input terminal connected to the at least one control bit and an output terminal connected to the port enable terminal of the second valve port, such that the computer means can selectively enable either one of the first and second valve ports by setting the logic state of the at least one control bit.

25. The invention of claim 11 wherein the computer means includes four valve ports, each valve port having a port enable terminal, wherein the at least one control bit includes first and second control bits, and wherein the invention further comprises:
 decoding means, responsive to the first and second control bits, for applying a port enable signal to the port enable terminal of a selected one of the valve ports in accordance with the logic state of the first and second control bits, such that the computer means can selectively enable any one of the four valve ports by appropriately setting the logic state of the first and second control bits.

26. The invention of claim 11 wherein the computer means includes first and second valve ports for generating the first and second brake control signals, respectively, each of the valve ports having a port enable terminal, wherein the invention further comprises:
 decoding means, responsive to the at least one control bit, for applying a port enable signal to the port enable terminal of a selected one of the first and second valve ports in accordance with the logic state of the at least one control bit, such that the computer means can selectively enable any one of the first and second valve ports by appropriately setting the logic state of the at least one control bit.

27. In a digital brake control system for a vehicle including first and second braked wheels, computer means for generating first and second brake control signals, and control means, responsive to the first and second control signals, for modifying the braking action applied to the first and second wheels, the improvement comprising:
 a memory device having a first address terminal and a plurality of additional address terminals, said memory device including means for storing a first set of parameters associated with the first wheel and means for storing a second set of parameters associated with the second wheel, each of the first set of parameters having a unique address in which the first address terminal is in a Logic 0 state, each of the second set of parameters having a unique address in which the first address terminal is in a Logic 1 state, corresponding parameters in the first and second sets of parameters having corresponding addresses with respect to the plurality of additional address terminals;
 an address bus having a plurality of conductors, each of said plurality of conductors extending between the computer means and a respective one of the plurality of additional address terminals;
 an output port coupled to the computer means, said port including a control bit which can be placed in one of two logic control states by the computer means;
 means for connecting the control bit to the first address terminal such that the logic state of the first address terminal is controlled by the control bit without affecting the state of the address bus.

28. The invention of claim 27 wherein the connecting means includes a simple connection between the control bit and the first address terminal.

29. The invention of claim 27 wherein the connecting means comprises:
 means, responsive to the computer means, for selectively controlling the logic state of the first address terminal independently of the logic state of the control bit such that the computer means can directly address both the first and second set of parameters, regardless of the logic state of the control bit.

30. The invention of claim 29 wherein the controlling means is responsive to an additional conductor included in the address bus.

31. The invention of claim 29 wherein the controlling means comprises a digital logic circuit having a first input terminal coupled to a first additional conductor included in the address bus, a second input terminal connected to a second additional conductor included in the address bus, a third input terminal connected to the control bit, and an output terminal connected to the first address terminal.

32. The invention of claim 31 wherein the logic circuit comprises:
 a first gate responsive to the control bit and the first additional conductor, said first gate generating a logic signal; and
 a second gate responsive to the logic signal and the second additional conductor, said second gate generating an output signal on the output terminal.

33. The invention of claim 32 wherein the first and second gates are NAND gates.

34. The invention of claim 27 wherein the memory device is a random access memory.

35. The invention of claim 27 wherein the computer means includes first and second valve ports for generating the first and second brake control signals, respectively, each of the valve ports having a port enable terminal, wherein the improvement further comprises:

decoding means, responsive to the control bit, for applying a port enable signal to the port enable terminal of a selected one of the first and second valve ports in accordance with the logic state of the control bit, such that the computer means can selectively enable any one of the first and second valve ports by appropriately setting the logic state of the control bit.

* * * * *